US008949725B1

(12) United States Patent
Goncharuk et al.

(10) Patent No.: US 8,949,725 B1
(45) Date of Patent: Feb. 3, 2015

(54) CHAT INFORMATION SYSTEM FOR PORTABLE ELECTRONIC DEVICES

(75) Inventors: Artem Goncharuk, Arlington, VA (US); Ilya Gelfenbeyn, Moscow (RU); Pavel Sirotin, Moscow (RU)

(73) Assignee: Speaktoit, Inc., Palo Alto, CA (US)

( * ) Notice: Subject to any disclaimer, the term of this patent is extended or adjusted under 35 U.S.C. 154(b) by 897 days.

(21) Appl. No.: 13/115,174

(22) Filed: May 25, 2011

Related U.S. Application Data

(60) Provisional application No. 61/348,852, filed on May 27, 2010.

(51) Int. Cl.
*G06F 3/00* (2006.01)

(52) U.S. Cl.
USPC .......................................................... 715/758

(58) Field of Classification Search
USPC .......................................................... 715/758
See application file for complete search history.

(56) References Cited

U.S. PATENT DOCUMENTS

| | | | |
|---|---|---|---|
| 6,944,472 B1 * | 9/2005 | Ishigami | 455/550.1 |
| 2005/0223308 A1 * | 10/2005 | Gunn et al. | 715/500 |
| 2007/0294229 A1 * | 12/2007 | Au | 707/3 |
| 2009/0007017 A1 * | 1/2009 | Anzures et al. | 715/835 |
| 2010/0185566 A1 * | 7/2010 | Schott et al. | 706/10 |
| 2010/0312547 A1 * | 12/2010 | Van Os et al. | 704/9 |
| 2012/0041903 A1 * | 2/2012 | Beilby et al. | 706/11 |
| 2012/0166969 A1 * | 6/2012 | Gillo et al. | 715/753 |

* cited by examiner

*Primary Examiner* — Boris Pesin
*Assistant Examiner* — Angie Badawi
(74) *Attorney, Agent, or Firm* — Patent Jurist; Georgiy L. Khayet

(57) ABSTRACT

A method and graphical user interface intended to simplify interaction between a user and a chat information system running on a portable electronic device that includes a touch screen. User interfaces and methods include user input controls (i.e., a virtual keyboard or voice recognition devices). The system also includes output trays, means for viewing chat history, means for displaying the Internet content and means for displaying graphical elements and avatars.

17 Claims, 16 Drawing Sheets

CHAT INFORMATION SYSTEM FOR PORTABLE ELECTRONIC DEVICES

CROSS-REFERENCE TO RELATED APPLICATIONS

This application claims priority of a Provisional U.S. Patent Application No. 61/348,852, filed on May 27, 2010 incorporated by reference herein in its entirety.

BACKGROUND OF THE INVENTION

1. Field of the Invention

The present invention is related to chat information systems, in particular, to chat information systems that use a touch screen and operate with a natural human voice, as well as keyboards.

2. Description of the Related Art

Conventional chat information systems that interact with users by means of natural human language (commonly called "chatbots") typically operate on desktop or laptop computers. The task of transferring chat information systems onto portable electronic devices (such as mobile phones, tablet computers, etc.) faces technological problems related to implementation of user interfaces limited by a screen size of portable devices.

Conventional chat information systems (i.e., chatbots) include the following elements: input interfaces (such as a keyboard or a microphone with voice recognition engine), fields for system output messages and graphical system elements for displaying chatbot "emotions" (i.e., "avatars" that make the chat system to be more appealing to a user).

Chat information systems can also include special means for viewing chat history, means for correcting input errors, interfaces for displaying additional media content (e.g., HTML content). All of these features need to be implemented in a chat information system for portable devices that include a touch screen. Conventional chat systems do not provide any features that can be used with the touch screen portable devices.

Accordingly, there is a need for user interfaces and methods for user interaction with chat information systems implemented on portable electronic devices.

SUMMARY OF THE INVENTION

The present invention is related to chat information systems that use a touch screen and operate with a natural human voice. The present invention provides for an efficient chat system operating on a portable electronic device that substantially obviates one or several of the disadvantages of the related art.

In one aspect of the invention there is provided a method and graphical user interface(s) intended to simplify interaction between a user and a chat information system running on a portable electronic device that includes a touch screen. According to the exemplary embodiment, user interfaces and methods include user input controls (i.e., a physical or virtual keyboard or voice recognition devices). The system also includes output trays, means for viewing chat history, means for displaying the Internet content and means for displaying graphical elements and avatars.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
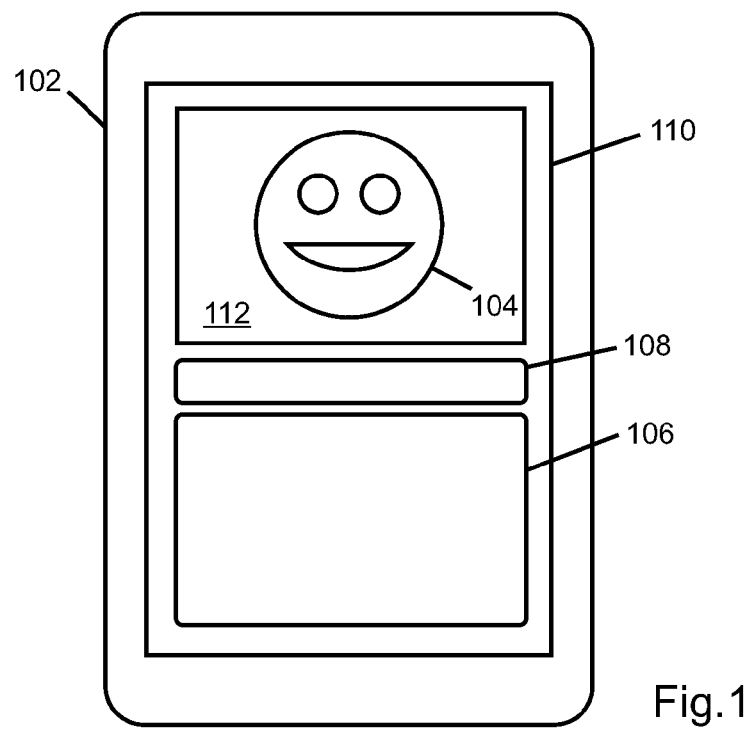
FIG. 1 illustrates a schematic diagram of a user interface for a portable electronic device in accordance with the exemplary embodiment.

According to an exemplary embodiment a method and graphical user interface(s) intended to simplify interaction between a user and a chat information system running on a portable electronic device that include a touch screen are provided. FIG. 1 is a schematic diagram illustrating a user interface for a portable electronic device 102, such as mobile phones, tablet computers, etc., connected to the Internet using mobile networks, such as cellular networks, wi-fi networks, wi-max, LTE, and so on. The device 102 includes a touch screen interface 110. The touch screen 110 can display one or more trays. A tray is a region within a graphical user interface.

In the exemplary embodiment the touch screen includes a tray (output box) 112 where an avatar 104 is displayed. Optionally, the user can select a different avatar, or construct it from various elements (e.g., select clothes, eyes, hair, etc.) Optionally, multiple trays for multiple topics can be employed. The touch screen 110 also includes a tray 106 for displaying a message generated by the system and a tray 108 for displaying a user input message (if it has been entered). According to the exemplary embodiment, a user can interact with the user interface by making a contact or by touching the trays. The contact can be a gesture, such as, for example, one or more taps, one or more swipes (from left to right, from right to left, upward and/or downward).

For example, a user can tap on the system message tray 106 and, in response to the contact, a virtual keyboard 402 (see FIG. 4) and a tray for user entry 404 (FIG. 4) will appear. If the contact with the tray 106 is maintained by the user for a time interval that is more than a pre-determined value (such as, for example, 0.5 or 1 second), function of a speech recognition module can start and the user is given an option to dictate one or more words after speech recognition is launched. The contact can also be maintained and recognition can be performed/displayed anywhere on the screen.

According to the exemplary embodiment, the user can swipe the trays 106 and/or 108 from left to right or from right to left and previous or next dialog messages can be displayed accordingly. In other words, the history of queries and responses can be displayed. Note that the user can swipe the tray 106 multiple times. While the portable device 102 is illustrated with certain components and a particular arrangement of these components is illustrated, it should be understood that there may be fewer or more components, two or more components may be combined, and positions of one or more components can be different from what is shown.

Figure 2:
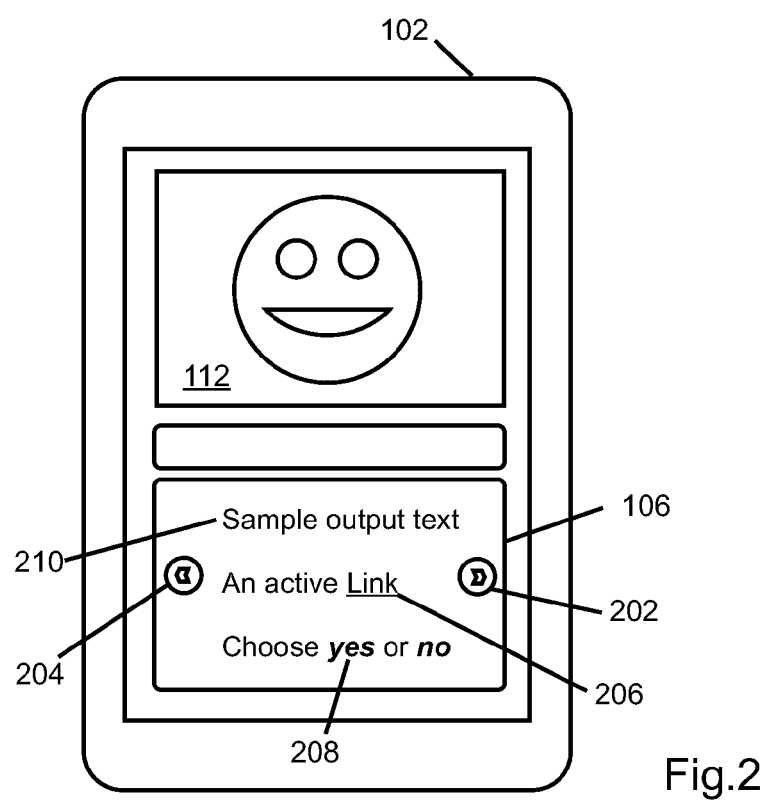
FIG. 2 illustrates a schematic diagram of a user interface with chat features for a portable electronic device in accordance with the exemplary embodiment.

FIG. 2 illustrates a schematic diagram of a user interface with chat features for a portable electronic device 102, in accordance with the exemplary embodiment. As shown in FIG. 2, in cases when a system output message 210 is too long to be displayed entirely in the tray 106, it can be displayed partially and optionally a button 202 appears to allow viewing next portions of the system message. A button 204 also appears to allow viewing previous portions of the system message. Alternatively, an option of scrolling a long system message within the tray 106 is provided. The system tray can also be scrolled, or increased in size if the user clicks on it and/or scrolls.

The system message 210 displayed in the tray 106 can contain one or more links 206. The user can click on the link 206 to open trays 302 or 304 (FIGS. 3A and 3B) for displaying Internet content or other type of rich content, such as images or video clips. In some embodiments, the web browser can open automatically. The displayed content can also include interactive elements and user input elements (such as, for example, buttons, select boxes, and other common user interface components). The system message 210 can also include one or more links 208 to a predefined user answer. If the user clicks on one of the links 208, a message from the user to the system containing the text of this answer 208 is sent.

Figure 3A:
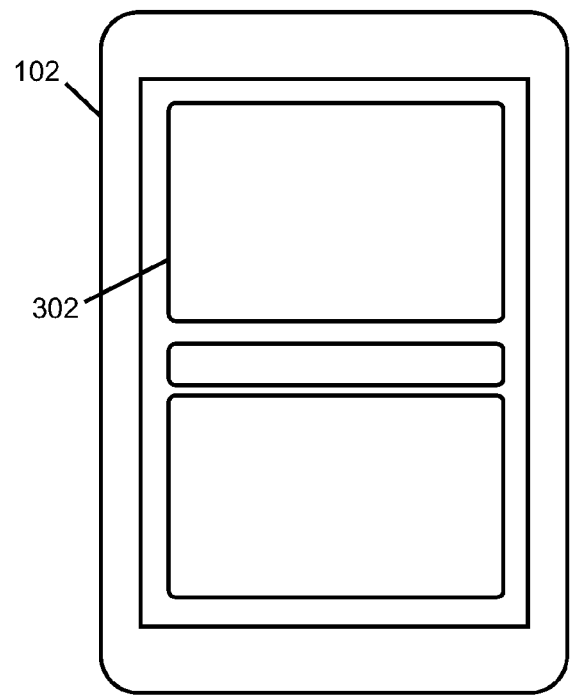
FIGS. 3A-3B illustrate a schematic diagram of a user interface with the trays for displaying Internet content or other type of rich content in accordance with the exemplary embodiment.
Figure 3B:
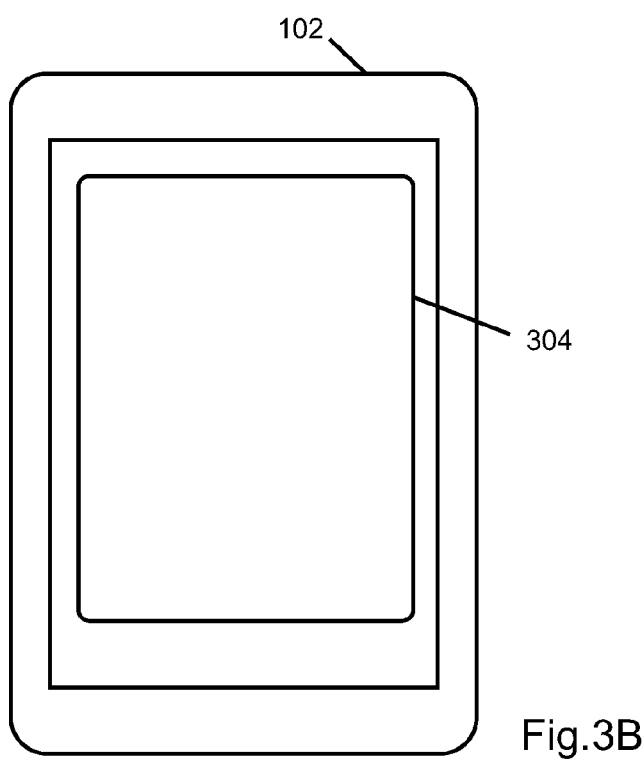

FIGS. 3A-3B illustrate a schematic diagram of a user interface for a portable electronic device with the trays for displaying Internet content or other type of rich content in accordance with the exemplary embodiment. The user interface can include the trays 302 or 304 for displaying content downloaded from the Internet or available locally on the portable device 102.

Figure 4:
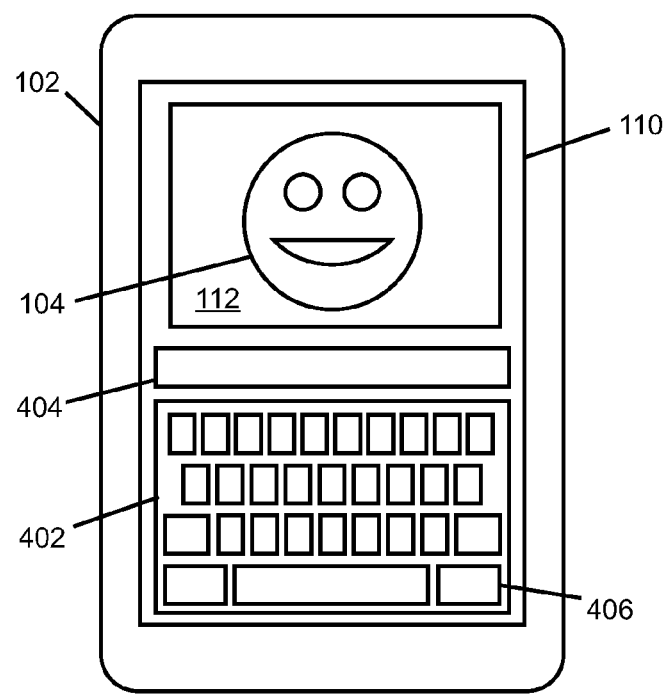
FIG. 4 illustrates a schematic diagram of a user interface with a virtual keyboard tray and a user input field tray in accordance with the exemplary embodiment.

FIG. 4 illustrates a schematic diagram of a user interface with a virtual keyboard tray and a user input field tray in accordance with the exemplary embodiment. The portable device 102 includes a touch screen 110. The user interface includes a tray 402 for displaying a virtual keyboard and a tray 404 providing a user input field. The user can type a message in the input field 404 by tapping keys on a virtual keyboard 402. Optionally, the virtual keyboard closes after the message has been sent. The user can alternatively use a physical keyboard if it is present in the device.

The user can then send a message to the system by tapping on a send button 406 or any other buttons designated for sending messages to the system (and optionally the virtual keyboard can close after the message is sent). The user can also return to viewing the previous system message (shown in FIG. 1) by tapping on the tray 112 displaying graphical image or video (avatar) 104. As an option, any click outside the virtual keyboard can return to a previous state.

Figure 5:
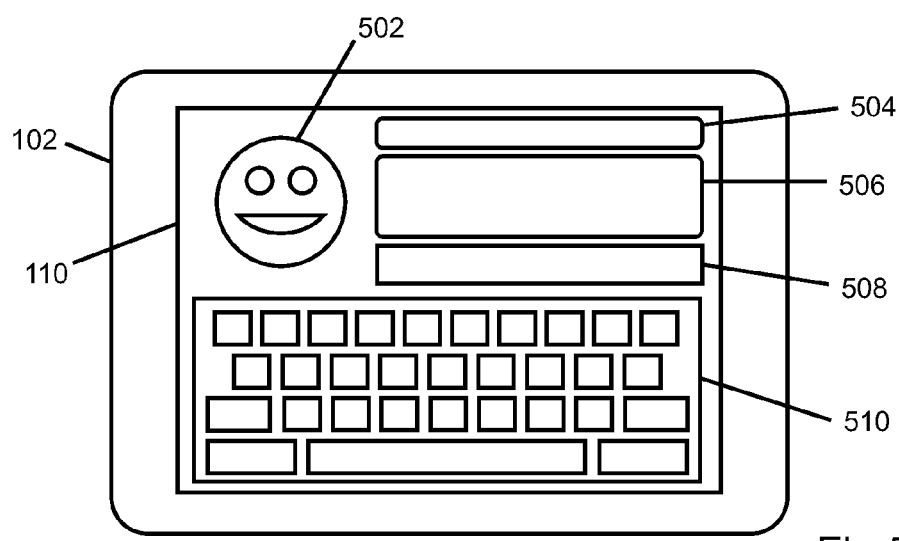
FIG. 5 illustrates a schematic diagram of a user interface for a portable electronic device in horizontal position in accordance with the exemplary embodiment.

FIG. 5 is a schematic diagram illustrating a user interface for a portable electronic device 102 in horizontal position (which, depending on configuration, might not be displayed, or displayed in response to user input). The user interface includes a tray with a virtual keyboard 510 as well as the trays 506 and 504 displaying a system message and a previous user input, respectively. The user interface also includes the user input field tray 508.

Figure 6:
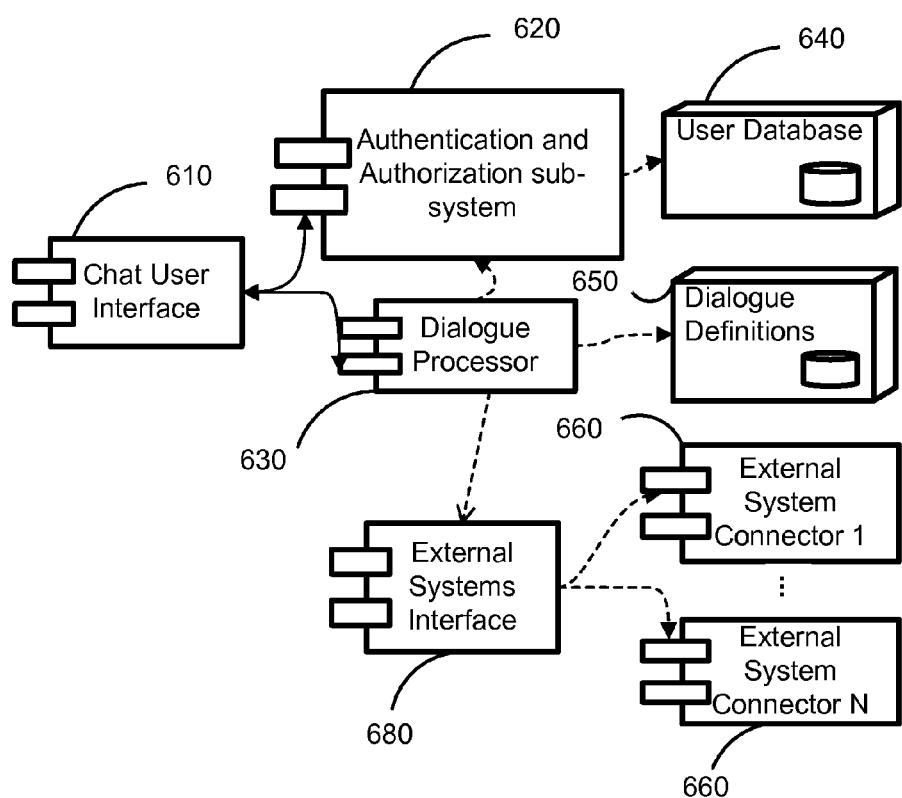
FIG. 6 illustrates a system architecture in accordance with the exemplary embodiment.

FIG. 6 illustrates system architecture in accordance with the exemplary embodiment. A chat user interface 610 is located on a portable device. The chat user interface 610 is connected to an authentication and authorization sub-system 620 implemented on a server. The authentication and authorization sub-system 620 retrieves user authentication/authorization data from a remote user database 640. The chat system interface 610 communicates with a dialog processor 630 implemented on the server. In the alternative case, almost all sub-systems could reside on the client.

The dialog processor 630 retrieves dialog definitions from a dialog definitions database 650 based on user actions performed with the chat user interface 610. The dialog definitions cover standard exchange situations, such as, for example, the greetings definitions, looking for weather and working with to-do lists:

User: {"Hi", "Hello", "Hello, *", "G'day"}
Chatbot: {"Hello, Master", "Hi, @username"}
User: {"Weather","What's the weather like?"}
Chatbot: {weather(@userlocation)}
User: {"I have to *"}
Chatbot: {"Do you really want to add * to your to-do list?"}

A dialog processor searches for responses from dialog definitions database 650 based on phrases and words contained in user requests. In addition to words, synonyms can be used, as well as dependencies on previous comments from the user, conditions, variables, etc. Also various available information about the user, i.e. user profile and preferences, may be used, which is derived from previous interactions with the user or from other sources (such as address book or user profile in social networks.) The dialog processor communicates with the authentication and authorization sub-system 620 for verifying the user. The dialog processor 630 also interacts with an external system interface 680. The external system interface 680 allows for the dialog processor 630 to send the user requests and additional information about the user to external systems (i.e., information servers) via external system connectors 670. If the dialog calls for connecting to an external service (e.g., "Show me a map of London, please"), the connector can extract, from the phrase, the parameters for working with an external service ("London"), form a request to an external service by using accessible data (e.g., user password for that service), perform additional actions, such as identify current location, and mediate dialog between the user and the external service (for example, when selecting a tour of London). Upon receipt of data from the external service, the connector forms a response to the user, in the user's language.

Figure 7:
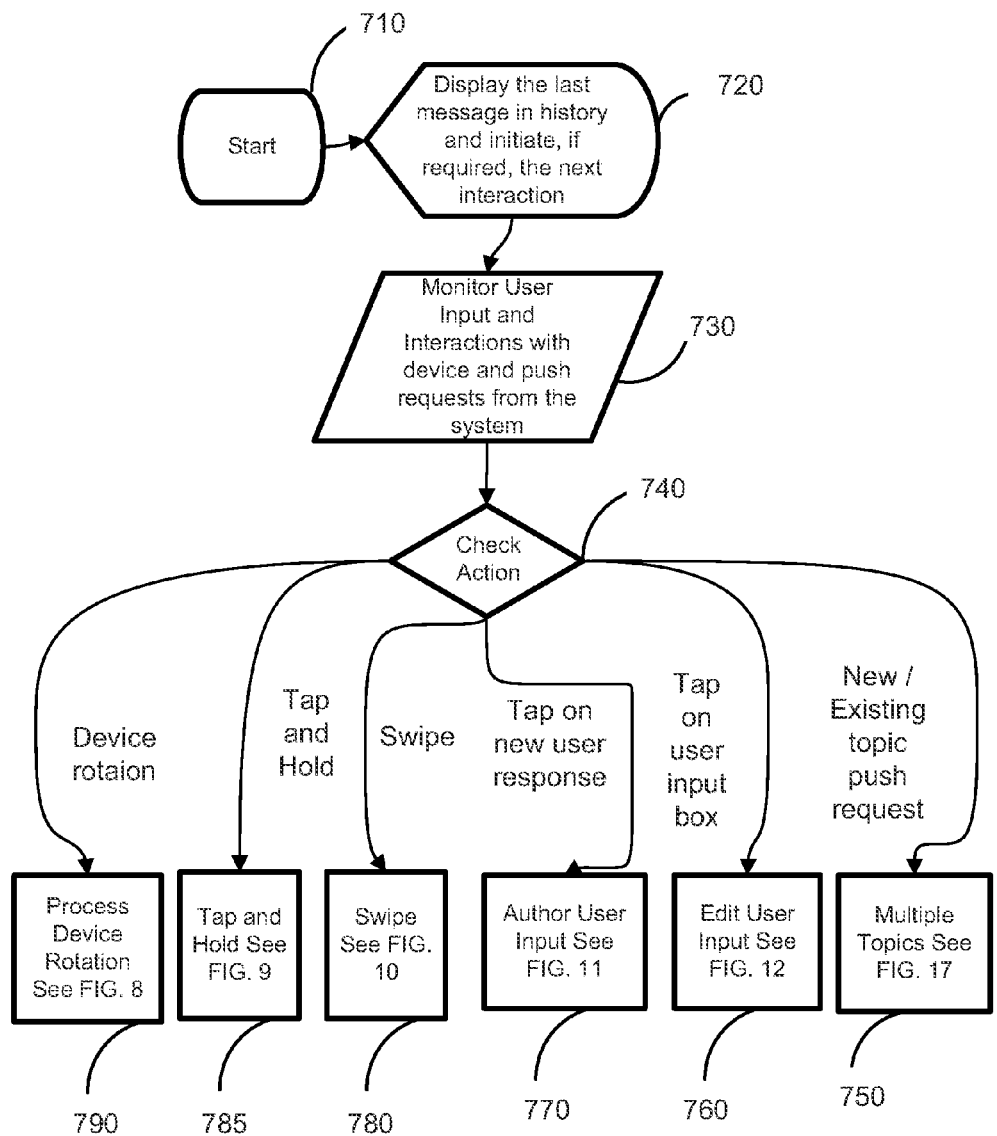
FIG. 7 illustrates a flow chart of a main user interface in accordance with the exemplary embodiment.

FIG. 7 illustrates a flow chart of a main user interface in accordance with the exemplary embodiment. A process is started in blocks 710. The last message in history is displayed to a user and the next interaction is initiated upon user request in block 720. After some time passes, the chatbot can "forget" the previous interaction (in the same way that people greet each other again after a passage of time, but not after a few minutes). The user inputs and interactions with the portable device are monitored in block 730 and the user requests are pushed from the system to the external systems or servers. A user action is checked in block 740.

Figure 17:
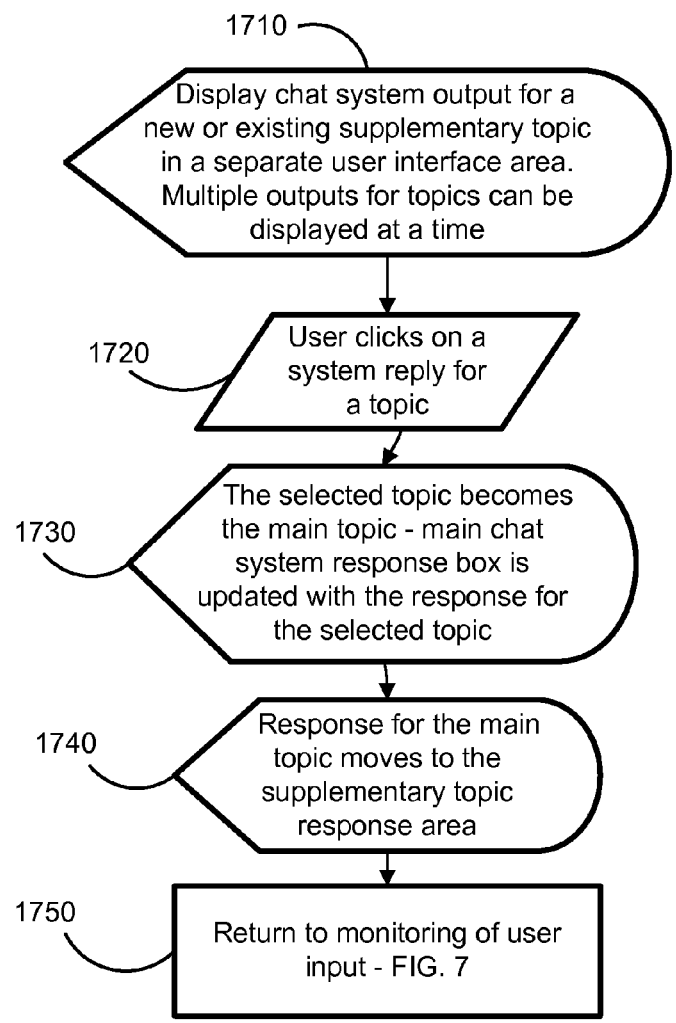
FIG. 17 illustrates a flow chart for handling multiple topics in accordance with the exemplary embodiment.

If the user action is a request for new or existing topic, the request is pushed to multiple topic processing block 750 (depicted in FIG. 17). If the user action is "tap on user input box," editing of user input is initiated in block 760 (depicted in FIG. 12). If the user action is "tap on new user response," the author user input processing is performed in block 770 (depicted in FIG. 11). If the user action is "swipe," the corresponding processing is performed in block 780 (depicted in FIG. 10). If the user action is "tap and hold," the corresponding processing is performed in block 785 (depicted in FIG. 9). If the user action is "device rotation," the corresponding processing is performed in block 790 (depicted in FIG. 8).

Figure 8:
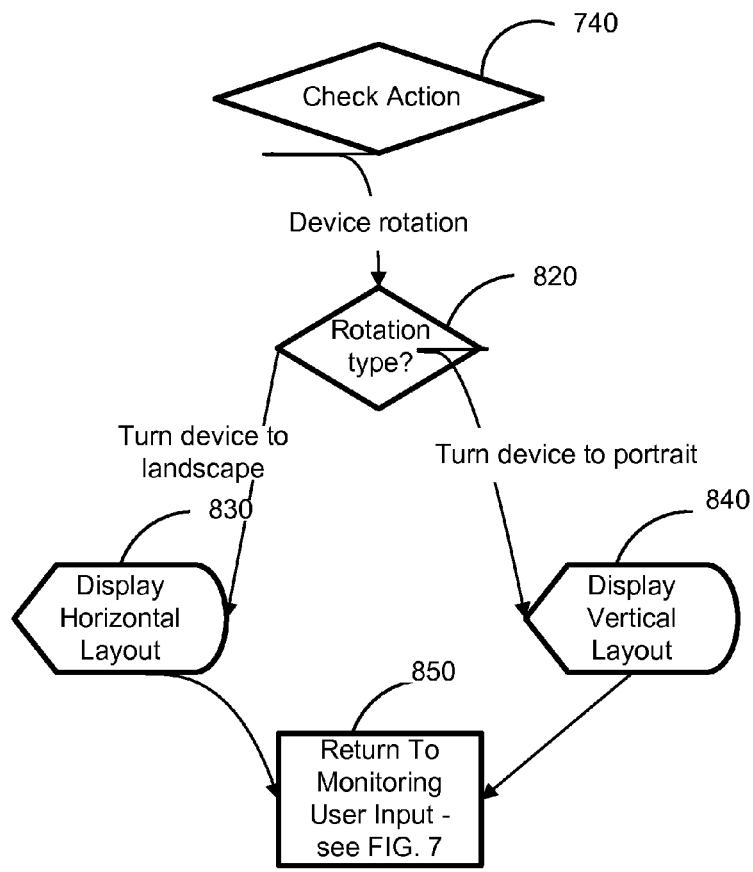
FIG. 8 illustrates a flow chart of rotation handling in accordance with the exemplary embodiment.

FIG. 8 illustrates a flow chart of rotation handling in accordance with the exemplary embodiment. If, in block 740, device rotation user action is detected, the process determines the rotation type in block 820. If the rotation type is "turn device to portrait," a vertical layout is displayed in block 840. If the rotation type is "turn device to landscape," a horizontal layout is displayed in block 830. Then, the process returns to monitoring user input in block 850 (as depicted in FIG. 7).

Figure 9:
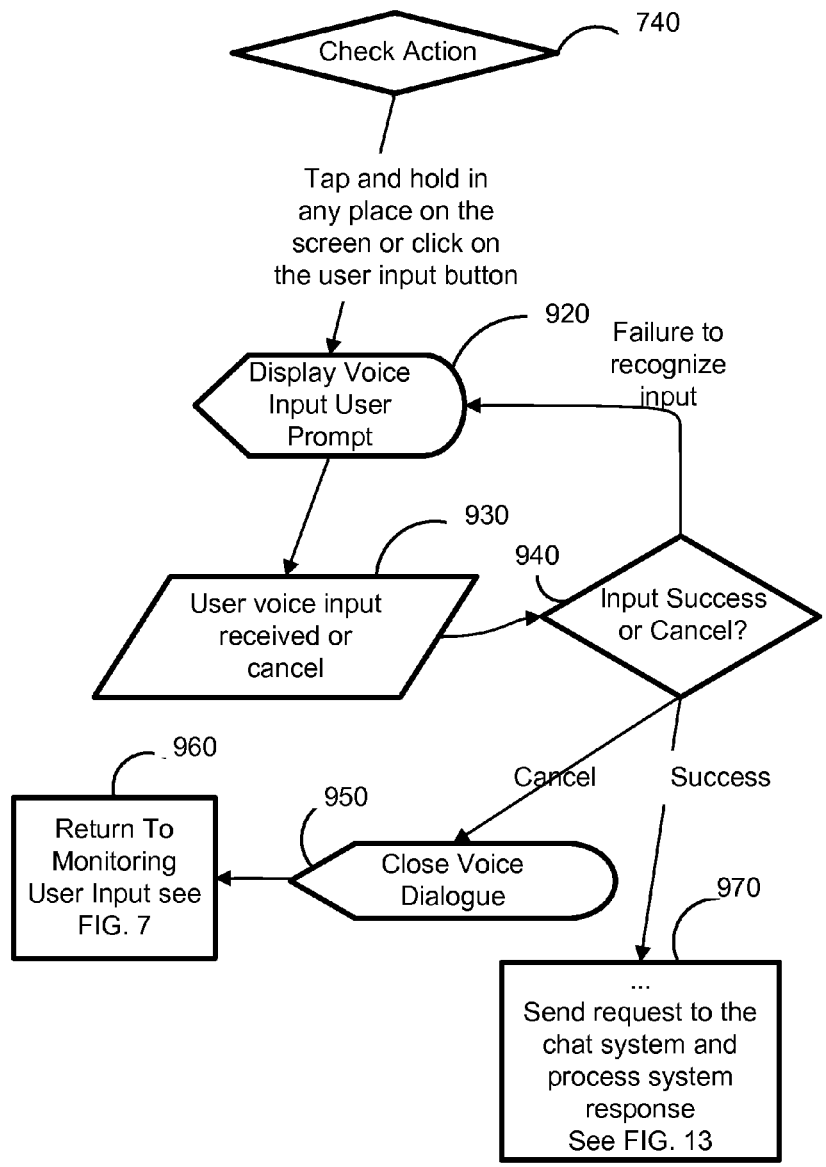
FIG. 9 illustrates a flow chart of a "tap and hold" user action in accordance with the exemplary embodiment.

FIG. 9 illustrates a flow chart of a "tap and hold" user action in accordance with the exemplary embodiment. If, in block 740, the "tap and hold" user action is detected, the interface displays voice user input prompt in block 920. Note that the "tap and hold" in any place on the screen or a click on a user input button trigger display of the voice user input prompt.

Then, in block 930, a user voice input is received or user cancels voice feature. If, in block 940, the use voice input is successfully processed, the request is sent to a chat system and the system response is processed in block 970 (depicted in detail in FIG. 13). If, in block 940, the voice input is canceled by the user, the voice dialog box is closed in block 950 and the process returns to monitoring user inputs in block 730 (depicted in FIG. 7). However, if in block 940, the user voice input is not recognized, the voice input user prompt is displayed again in block 920.

Figure 10:
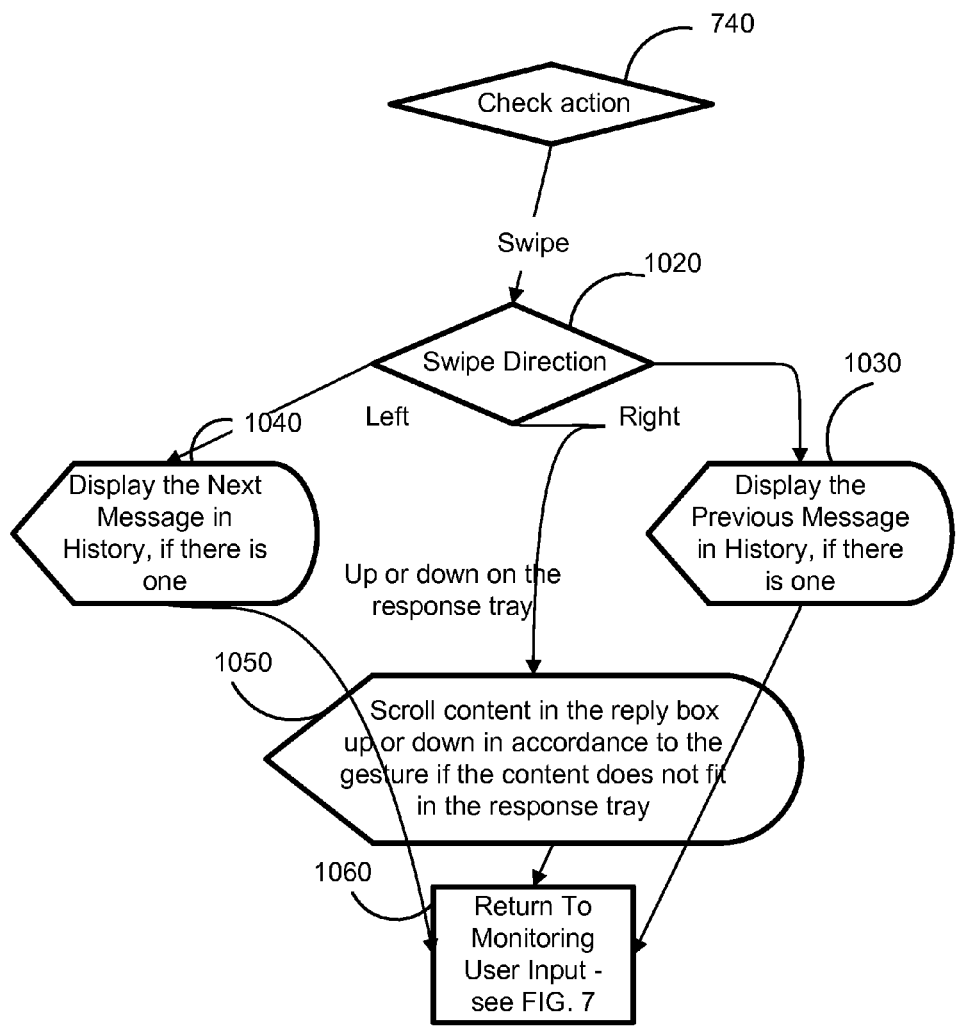
FIG. 10 illustrates a flow chart of a "swipe" user action in accordance with the exemplary embodiment.

FIG. 10 illustrates a flow chart of a "swipe" user action in accordance with the exemplary embodiment. If, in block 740, the "swipe" user action is detected, the interface process determines a direction of the swipe action in block 1020. In case of a right swipe, the previous message in history is displayed in block 1030 (if such message exists).

In case of left swipe, the next message in history is displayed in block 1040 (if such message exists). If the swipe is performed in up/down direction on the response tray, the content of the response tray is scrolled up or down respectively (if the content does not fit into the response tray entirely) in block 1050. Then the interface process returns to monitoring user input in block 1060 (as depicted in FIG. 7).

Figure 11:
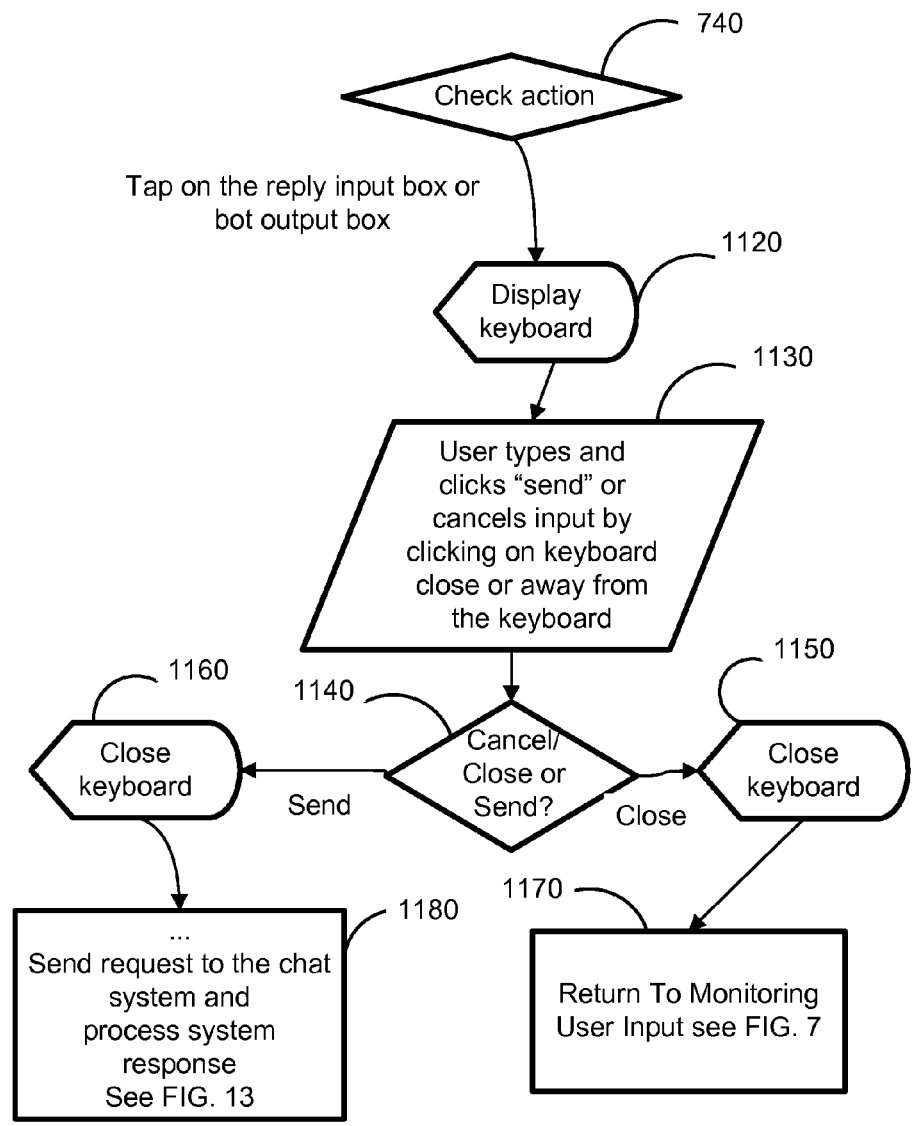
FIG. 11 illustrates a flow chart of an author user input action in accordance with the exemplary embodiment.

FIG. 11 illustrates a flow chart of an author user input action in accordance with the exemplary embodiment. If, in block 740, the tap on the reply input box or, optionally, tap on the chatbot output box is detected, the interface process displays a virtual keyboard in block 1120. Then, in block 1130, the user types and clicks "send" or cancels the input by clicking on "keyboard close" button or by clicking away from the keyboard.

If "close" action is detected in block 1140, the interface process closes the virtual keyboard in block 1150 and returns to monitoring user inputs in block 1170. If "send" action is detected in block 1140, the virtual keyboard is closed in block 1160 and the request is sent to the chat system and the system response is processed in block 1180 (as depicted in FIG. 13).

Figure 12:
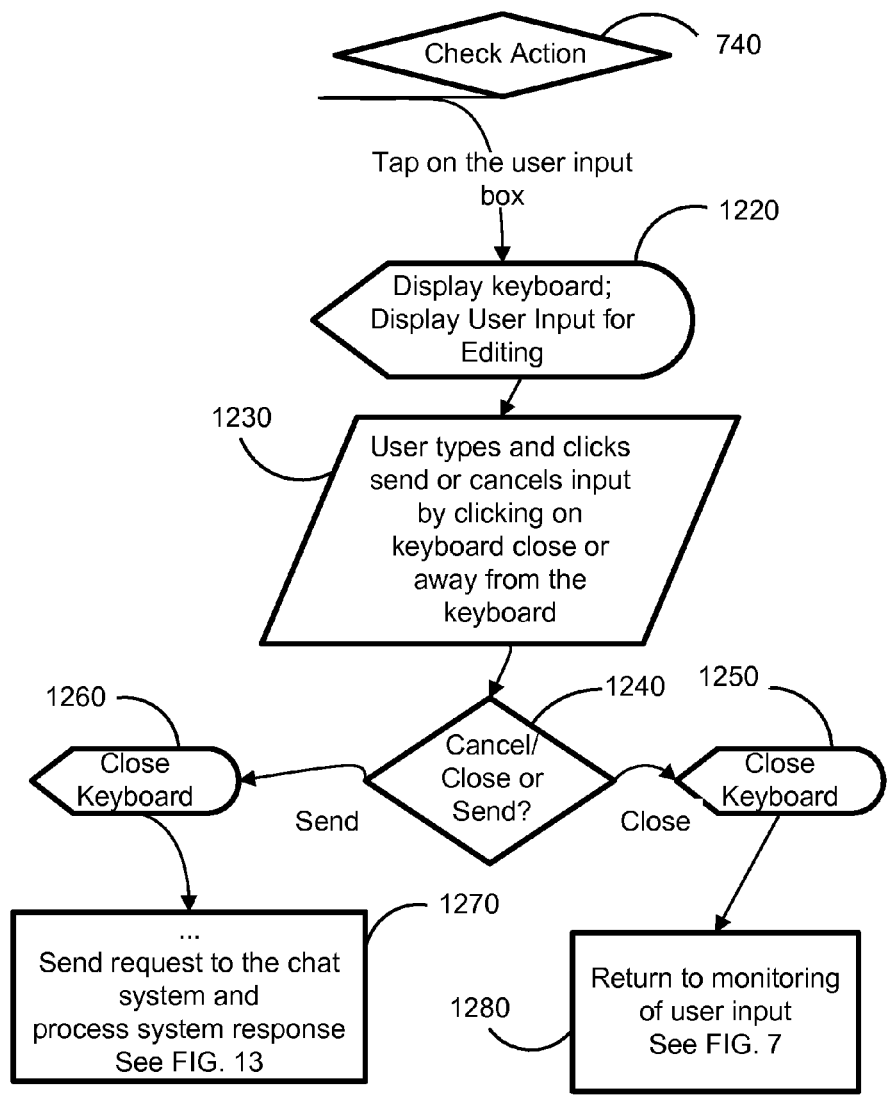
FIG. 12 illustrates a flow chart of an edit user input action in accordance with the exemplary embodiment.

FIG. 12 illustrates a flow chart of an edit user input action in accordance with the exemplary embodiment. If, in block 740, the tap on the user input box is detected, the interface process displays a virtual keyboard and user input field for editing in block 1220. Then, in block 1230, the user types and clicks "send" or cancels the input by clicking on "keyboard close" button or by clicking away from the keyboard.

If in block 1240, "close" action is detected, the keyboard is closed in block 1250 and the interface process returns to monitoring of user inputs in block 1280. If in block 1240, "send" action is detected, the keyboard is closed in block 1260 and the interface process sends request to the chat system and processes system response in block 1270.

Figure 13:
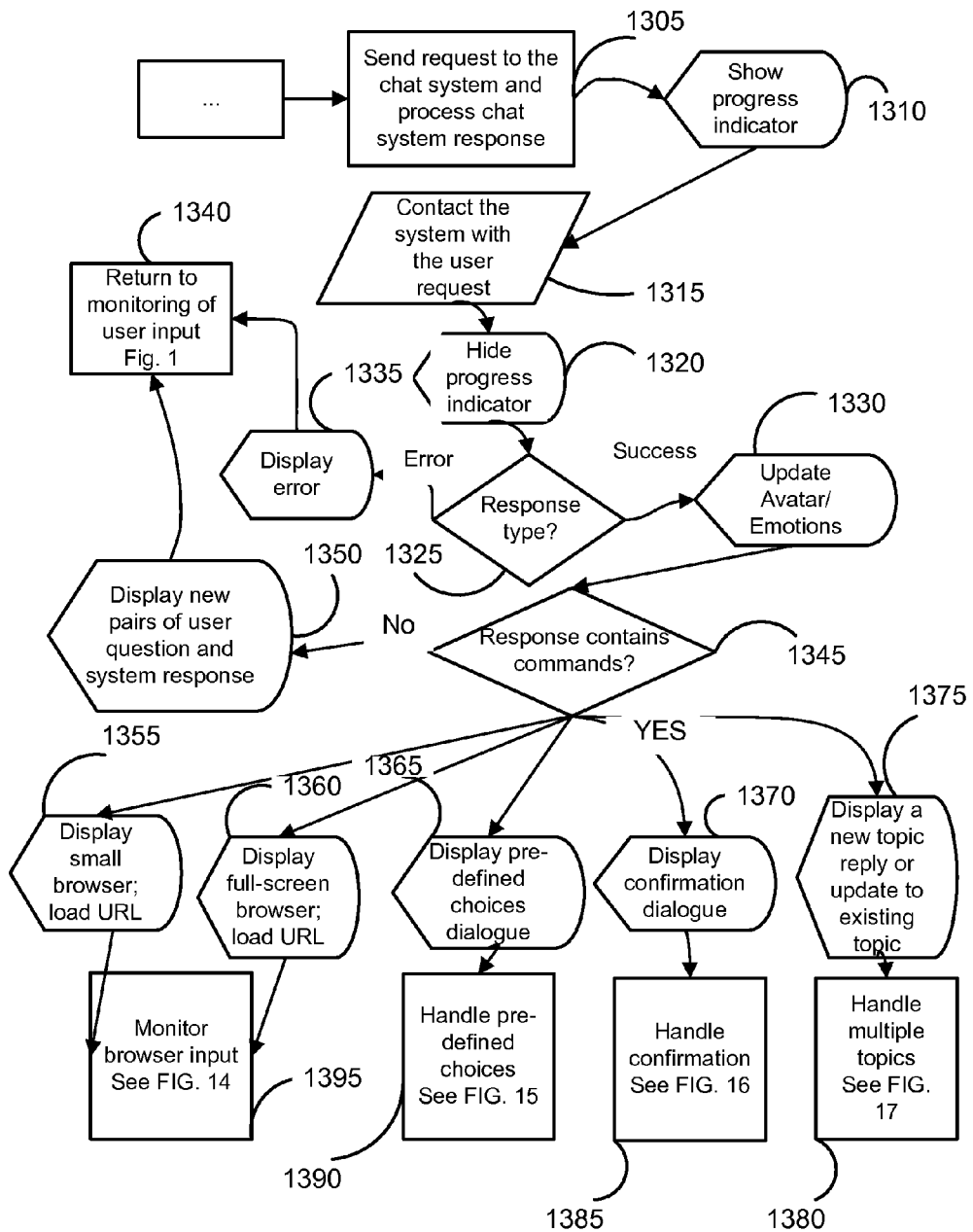
FIG. 13 illustrates a flow chart of getting and displaying system response in accordance with the exemplary embodiment.

FIG. 13 illustrates a flow chart of getting and displaying system response in accordance with the exemplary embodiment. A request is sent to the chat system and the chat system response is processed in block 1305. In block 1310, the interface process shows a progress indicator. Then, in block 1315, the system is contacted with the user request and the progress indicator is hidden in block 1320. In block 1325, the response type is determined.

If the response is "success," the avatar (i.e., an emotional animation, an image, a video, etc.) is updated in block 1330. If the response indicates "an error," the error is displayed in block 1335 and the process returns to monitoring of the user inputs in block 1340. After the avatar is updated in block 1330, the response is analyzed for commands in block 1345. If no commands are detected, the interface process displays new pairs of user questions and system response in block 1350, after which the process returns to block 1340 for monitoring of the user inputs.

If the response contains a command for a new topic, the new topic is displayed or existing topic is updated in block 1375 and multiple topics are handled in block 1380 (depicted in detail in FIG. 17). If the response contains a command for a confirmation dialog, the confirmation dialog is displayed in block 1370 and confirmation is handled in block 1385 (depicted in detail in FIG. 16). If the response contains a command for pre-defined choices, the pre-defined choices are displayed in block 1365 and the pre-defined choices are handled in block 1390 (depicted in detail in FIG. 15).

Figure 14:
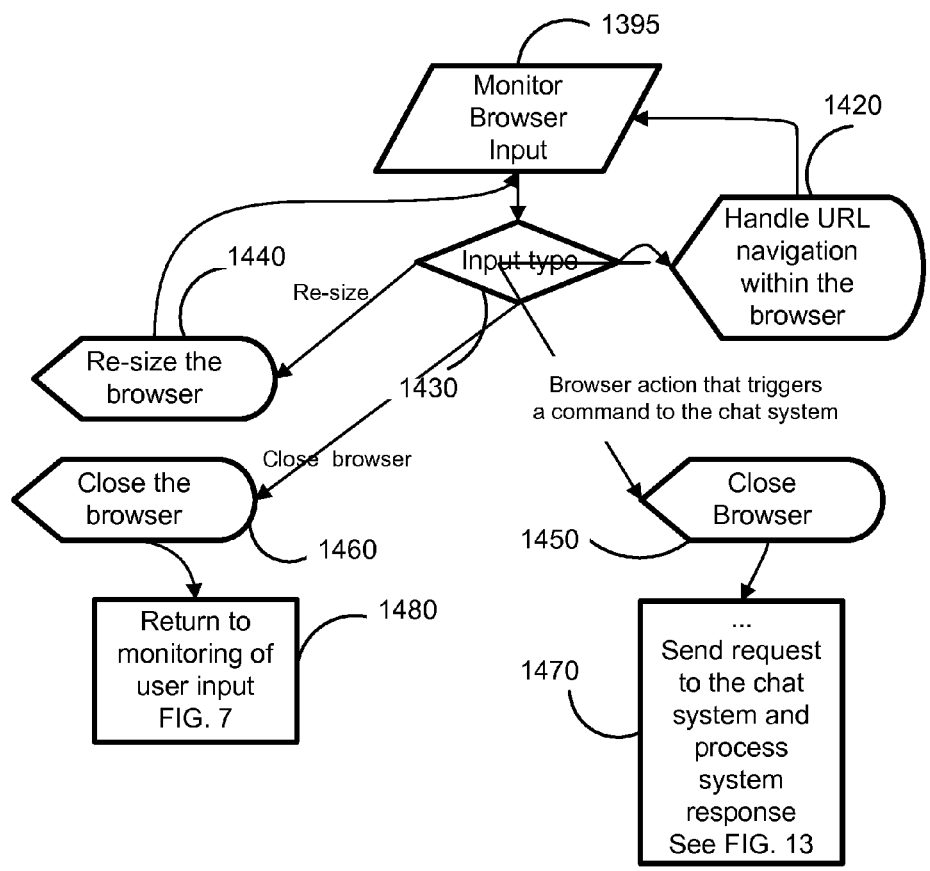
FIG. 14 illustrates a flow chart of monitoring browser input in accordance with the exemplary embodiment.

If the response contains a command for a full-screen browser, the full-screen browser is displayed and the URL is loaded in block 1360 and the browser input is monitored in block 1395 (depicted in detail in FIG. 14). If the response contains a command for a small browser, the small browser is displayed and the URL is loaded in block 1355 and the browser input is monitored in block 1395 (depicted in detail in FIG. 14).

FIG. 14 illustrates a flow chart for monitoring browser input in accordance with the exemplary embodiment. The browser input is monitored in block 1395. The input type is determined in block 1430. If the browser input requires re-sizing of the browser, the browser is re-sized in block 1440 after which the process returns to block 1395 for monitoring browser inputs.

If the browser input, in block 1430, triggers a command to the chat system, the browser is closed in block 1450 and the process sends the request to the chat system and processes the system response in block 1470. URL navigation within the browser is handled in block 1420, after which the process goes back to monitoring of the browser input in block 1395. If the input, in block 1430, requires closing the browser, the browser is closed in block 1460 and the process returns to monitoring of user input in block 1480 (as depicted in FIG. 7).

Figure 15:
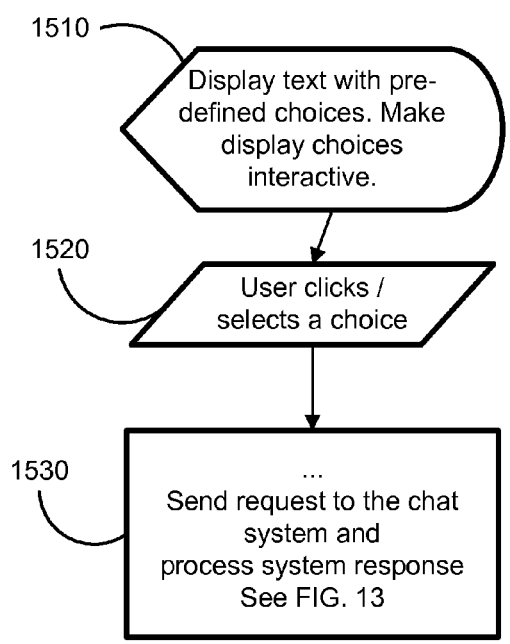
FIG. 15 illustrates a flow chart of handling pre-defined choices in accordance with the exemplary embodiment.

FIG. 15 illustrates a flow chart of handling pre-defined choices in accordance with the exemplary embodiment. In block 1510, the text with pre-defined choices is displayed and the choices are made interactive. A user selects a choice by clicking in block 1520. Then, a request is sent to the chat system and the system response is processed in block 1530 (as depicted in FIG. 13).

Figure 16:
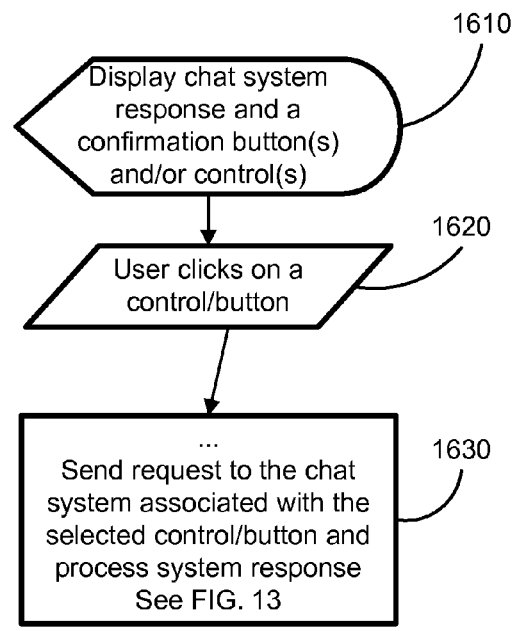
FIG. 16 illustrates a flow chart for handling confirmations in accordance with the exemplary embodiment.

FIG. 16 illustrates a flow chart for handling confirmations in accordance with the exemplary embodiment. In block 1610, the chat system response and confirmation button(s)/control(s) are displayed. A user clicks on the button/control in block 1620. Then, a request is sent to the chat system and the system response is processed in block 1630 (as depicted in FIG. 13).

FIG. 17 illustrates a flow chart for handling multiple topics in accordance with the exemplary embodiment. In block 1710, the chat system output for a new or existing topic is displayed in a separate user interface area. Note that multiple outputs for topics can be displayed at a time. A user clicks on a system reply for a topic in block 1720. Then, in block 1730, the selected topic becomes the main topic. The main chat system response box is updated with the response for the selected topic. In block 1740, response for the main topic moves to the supplementary topic response area. Then, in block 1750, the process returns to monitoring of user inputs.

Figure 18:
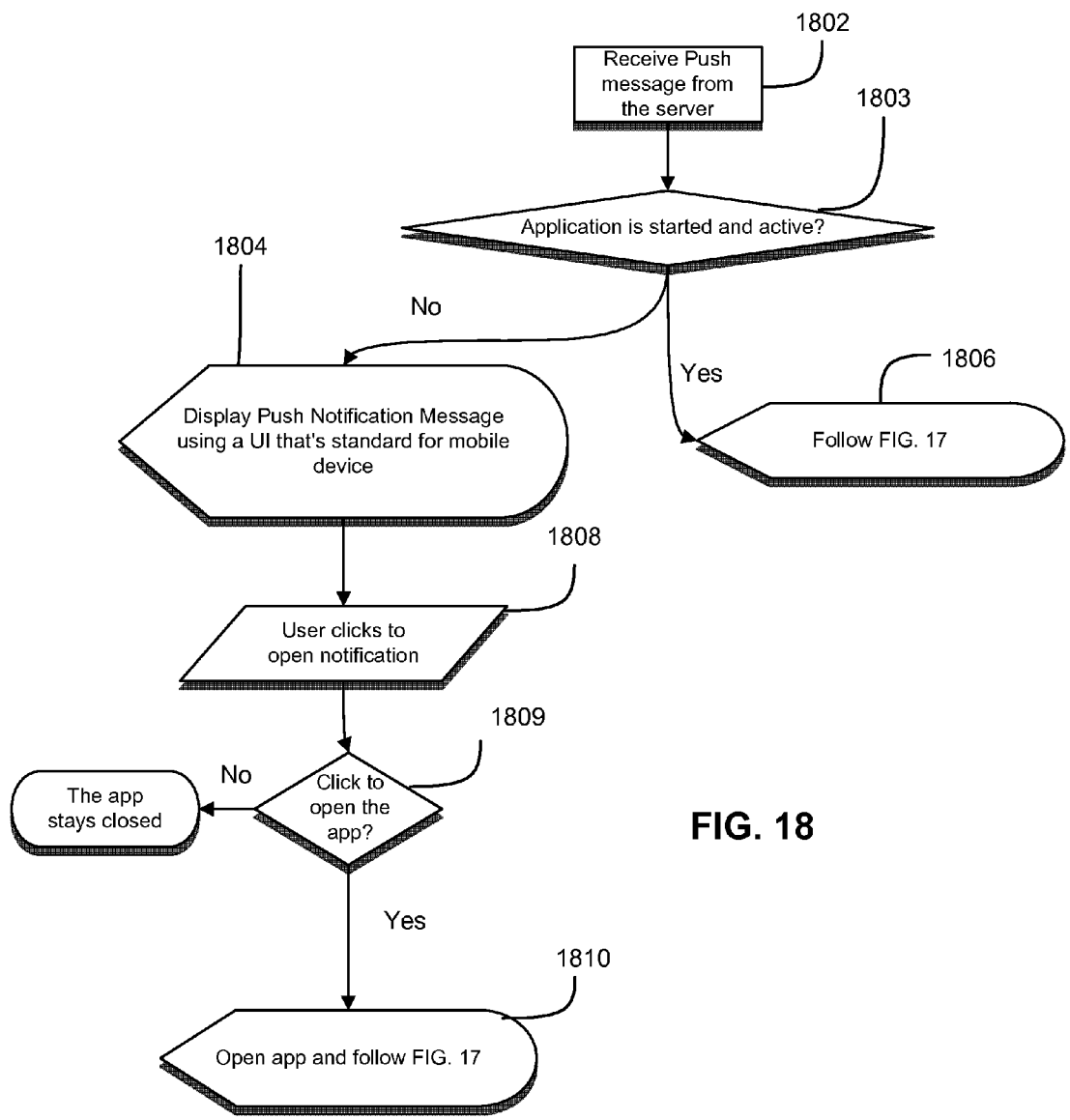
FIG. 18 illustrates how the system can send "push" notifications to the client.

FIG. 18 illustrates how the system can send "push" notifications to the client (e.g., when a calendar update is received or a "to do" item is due), step 1802. If the application is active (step 1803), push notification is displayed (step 1804) using standard means for the operating system of choice (e.g., using a dialogue for IPHONE or similar). If user clicks to open the application (step 1809), the system opens the app to FIG. 17 (step 1810).

If the client application is active, push messages will be displayed using the same UI as the topics (step 1806) and according to FIG. 17. Additional UI elements may be presented to attract user's attention to the push notification.

Those skilled in the art will appreciate that the proposed system provides for convenient interaction between a user and a chatbot implemented on portable electronic devices.

Having thus described a preferred embodiment, it should be apparent to those skilled in the art that certain advantages of the described method and apparatus have been achieved. It should also be appreciated that various modifications, adaptations and alternative embodiments thereof may be made within the scope and spirit of the present invention. The invention is further defined by the following claims.

What is claimed is:

1. A chat information system for a handheld portable electronic device, the system comprising: a touch screen, a processor, and a chatbot interface; at least one tray for displaying a chatbot avatar; a tray for displaying a message generated by a chat system; a tray for displaying Internet content; a tray for displaying a virtual keyboard; a tray for user input fields; a system voice output component; a user voice input component; and a plurality of interactive elements, wherein a user input is processed by the chatbot interface and the chatbot avatar is updated based on a chatbot response to the user input; wherein the chatbot interface is configured to: monitor user actions and identify the user actions, the user actions include: a device rotation, a tap and hold on the touch screen, a swipe on the touch screen, an author user input on the touch screen, an edit user input on the touch screen, and a multiple topic request; when the swipe on the touch screen is identified, determine a swipe direction; and when a first swipe direction is identified, display a first response from the chatbot system instead of a second response from the chatbot system; and when a second swipe direction is identified, display the second response from the chatbot system instead of the first response from the chatbot system, wherein the second swipe direction differs from the first swipe direction; when the device rotation is identified, change a vertical layout to a horizontal layout, or vice versa, of at least one of the following: the at least one tray for displaying a chatbot avatar, the tray for displaying a message generated by a chat system, the tray for displaying Internet content, the tray for displaying a virtual keyboard, the tray for user input fields; when the tap and hold on the touch screen is identified, launch the user voice input module; when the author user input on the touch screen is identified, launching the virtual keyboard; when the edit user input on the touch screen is identified, launch the virtual keyboard and display the user input for editing; when the multiple topic request is identified, display one or more supplementary topics.

2. The system of claim 1, wherein the external system connectors belong to remote information servers.

3. The system of claim 2, wherein the external system interface retrieves information from the remote information servers based on user requests.

4. The system of claim 1, wherein chatbot user interface includes a voice engine for receiving and processing user voice input.

5. The system of claim 1, wherein the chatbot user interface includes an avatar for displaying animations, static graphics, or videos reflecting chat system response to user actions.

6. The system of claim 1, wherein the chatbot user interface monitors user inputs or requests and pushes the user inputs or requests to a dialog processor.

7. The system of claim 1, wherein the chatbot user interface accepts and processes a voice user input and sends requests to the remote external systems based on the first user input or the second user input.

8. A method for implementing a chatbot on a portable electronic device having a touch screen, the method comprising: displaying a chatbot avatar; displaying a message generated by a chat system; displaying Internet content; displaying user input fields; and displaying a plurality of interactive elements, wherein a user input is processed by the chatbot interface and the chatbot avatar is updated based on a chatbot response to the user input; wherein the chatbot interface is configured to: monitor user actions and identify the user actions, the user actions include: a device rotation, a tap and hold on the touch screen, a swipe on the touch screen, an author user input on the touch screen, an edit user input on the touch screen, and a multiple topic request; when the swipe on the touch screen is identified, determine a swipe direction; and when a first swipe direction is identified, display a first response from the chatbot system instead of a second response from the chatbot system; and when a second swipe direction is identified, display the second response from the chatbot system instead of the first response from the chatbot system, wherein the second swipe direction differs from the first swipe direction; when the device rotation is identified, change a vertical layout to a horizontal layout, or vice versa, of at least one of the following: the chatbot avatar, the message generated by a chat system, the Internet content, the virtual keyboard, the user input fields; when the tap and hold on the touch screen is identified, launch a user voice input component; when the author user input on the touch screen is identified, launch a virtual keyboard; when the edit user input on the touch screen is identified, launch the virtual keyboard feature and display the user input fields for editing; when the multiple topic request is identified, display one or more supplementary topics.

9. The method of claim 8, wherein when the device rotation is identified, changing a vertical layout of the chatbot interface to a horizontal layout of the chatbot interface.

10. The method of claim 8, wherein when the device rotation is identified, changing a horizontal layout of the chatbot interface to a vertical layout of the chatbot interface.

11. The method of claim 8, wherein when the tap and hold on the touch screen is identified, launching a voice user prompt feature.

12. The method of claim 8, wherein when the author user input on the touch screen is identified, launching a virtual keyboard feature of the chatbot interface.

13. The method of claim 8, wherein when the edit user input on the touch screen is identified, launching a virtual keyboard feature of the chatbot interface and displays the user input for editing.

14. The method of claim 8, wherein when the multiple topic request is identified, displaying new supplementary topics.

15. A portable device having a touch screen, a processor and a chatbot interface, the portable device comprising: at least one tray for displaying a chatbot avatar; a tray for displaying a message generated by a chat system; a tray for displaying Internet content; a tray for displaying a virtual keyboard; a tray for user input fields; a system voice output; a user voice input; and a plurality of interactive elements, wherein a user input is processed by the chatbot interface and the chatbot avatar is updated based on a chatbot response to the user input; wherein the chatbot interface is configured to: monitor user actions and identify the user actions, the user actions include: a device rotation, a tap and hold on the touch screen, a swipe on the touch screen, an author user input on the touch screen, an edit user input on the touch screen, and a multiple topic request; when the swipe on the touch screen is identified, determine a swipe direction; and when a first swipe direction is identified, display a first response from the chatbot system instead of a second response from the chatbot system; and when a second swipe direction is identified, display the second response from the chatbot system instead of the first response from the chatbot system, wherein the second swipe direction differs from the first swipe direction; when the device rotation is identified, change a vertical layout to a horizontal layout, or vice versa, of at least one of the following: the at least one tray for displaying a chatbot avatar, the tray for displaying a message generated by a chat system, the tray for displaying Internet content, the tray for displaying a virtual keyboard, the tray for user input fields; when the tap and hold on the touch screen is identified, launch the user voice input; when the author user input on the touch screen is identified, launching the virtual keyboard; when the edit user input on the touch screen is identified, launch the virtual keyboard and display the user input for editing; when the multiple topic request is identified, display one or more supplementary topics.

16. The portable device of claim 15, wherein the chatbot avatar displays animations, including graphics or video, reflects emotions of the chatbot avatar.

17. The portable device of claim 15, wherein the interactive elements are any of: buttons; select boxes; links; menus; and input boxes.

* * * * *